US011215986B2

(12) United States Patent
Chen et al.

(10) Patent No.: US 11,215,986 B2
(45) Date of Patent: *Jan. 4, 2022

(54) AUTOMATED DRONE SYSTEMS

(71) Applicant: NIGHTINGALE INTELLIGENT SYSTEMS, San Francisco, CA (US)

(72) Inventors: Ian Chen, San Jose, CA (US); Hugo Boyer, San Francisco, CA (US); John Ming-Jey Hsu, Mountain View, CA (US); Frank Berthold Alfons Gaugel, San Francisco, CA (US); Davor Bauk, New York, NY (US); Arnd Schoter, Grimbergen (BE); Cyril Damm, Ditzingen (DE); Jack Wu, San Francisco, CA (US)

(73) Assignee: NIGHTINGALE INTELLIGENT SYSTEMS, San Francisco, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/413,342

(22) Filed: May 15, 2019

(65) Prior Publication Data

US 2019/0265694 A1    Aug. 29, 2019

Related U.S. Application Data

(63) Continuation of application No. 15/832,648, filed on Dec. 5, 2017, now Pat. No. 10,303,167, which is a (Continued)

(51) Int. Cl.
*G05D 1/00* (2006.01)
*G08G 5/04* (2006.01)
(Continued)

(52) U.S. Cl.
CPC ......... *G05D 1/0038* (2013.01); *B64C 39/024* (2013.01); *G05D 1/0044* (2013.01);
(Continued)

(58) Field of Classification Search
CPC .. G05D 1/0038; G05D 1/0044; B64C 39/024; B64C 2201/123; B64C 2201/201;
(Continued)

(56) References Cited

U.S. PATENT DOCUMENTS 9,864,372 B2    1/2018 Chen et al.
2003/0227395 A1   12/2003 Zeineh
(Continued)

FOREIGN PATENT DOCUMENTS

CN    201774628 U    3/2011
CN    104085529 A   10/2014
(Continued)

OTHER PUBLICATIONS

Chinese Examination Report and Search Report (with English Translation), dated Jul. 13, 2018, issued in corresponding Chinese Application No. 201680027519.6, 11 pages.
(Continued)

*Primary Examiner* — Yuen Wong
(74) *Attorney, Agent, or Firm* — Dentons US LLP

(57) ABSTRACT

An automated drone security system for surveilling a location includes one or more drones with onboard sensors and an imaging device for measuring surveillance data. The surveillance data may include images, telemetry data, infrared data, or other detectable information of the location. Drones may be capable of executing one or multiple flight operations as well as storing and transmitting the surveillance data to a server assembly operable for coordinating the drone and receiving the surveillance data. A drone dock may be included for drone launching, landing, and/or storing the drones. A user computing device may be in communication with the server assembly and the drone(s), the user computing device being capable of receiving user input and displaying surveillance data from the drone. Flight operations
(Continued)

associated with surveilling the location may be automatically and/or manually controlled by the user computing device and/or or the server assembly in connection with the location.

19 Claims, 9 Drawing Sheets

Related U.S. Application Data continuation of application No. 15/068,442, filed on Mar. 11, 2016, now Pat. No. 9,864,372.

(60) Provisional application No. 62/132,311, filed on Mar. 12, 2015.

(51) Int. Cl.
*G07C 5/00* (2006.01)
*G08C 17/02* (2006.01)
*H04L 29/08* (2006.01)
*G08G 5/00* (2006.01)
*G06K 9/00* (2006.01)
*B64C 39/02* (2006.01)
*H04L 29/06* (2006.01)

(52) U.S. Cl.
CPC ..... *G06K 9/00637* (2013.01); *G06K 9/00664* (2013.01); *G06K 9/00771* (2013.01); *G07C 5/008* (2013.01); *G08C 17/02* (2013.01); *G08G 5/006* (2013.01); *G08G 5/0013* (2013.01); *G08G 5/0026* (2013.01); *G08G 5/0052* (2013.01); *G08G 5/0069* (2013.01); *G08G 5/0078* (2013.01); *G08G 5/0086* (2013.01); *G08G 5/045* (2013.01); *H04L 65/4092* (2013.01); *H04L 67/12* (2013.01); *H04L 67/125* (2013.01); *B64C 2201/123* (2013.01); *B64C 2201/127* (2013.01); *B64C 2201/146* (2013.01); *B64C 2201/201* (2013.01)

(58) Field of Classification Search
CPC ........ B64C 2201/127; B64C 2201/146; H04L 65/4092; H04L 67/12; H04L 67/125; G06K 9/00637; G06K 9/00664; G06K 9/00771; G08G 5/0013; G08G 5/0026; G08G 5/0052; G08G 5/006; G08G 5/0069; G08G 5/0078; G08G 5/0086; G08G 5/045; G07C 5/008; G08C 17/02
See application file for complete search history.

(56) References Cited

U.S. PATENT DOCUMENTS

| | | | |
|---|---|---|---|
| 2008/0243372 A1 | 10/2008 | Bodin et al. | |
| 2010/0013917 A1 | 1/2010 | Hanna et al. | |
| 2012/0069131 A1 | 3/2012 | Abelow | |
| 2012/0271491 A1* | 10/2012 | Spata | G05D 23/19 |
| | | | 701/3 |
| 2014/0129059 A1 | 5/2014 | Scarlatti et al. | |
| 2014/0316614 A1 | 10/2014 | Newman | |
| 2016/0127641 A1 | 5/2016 | Gove | |
| 2016/0266579 A1 | 9/2016 | Chen et al. | |

FOREIGN PATENT DOCUMENTS

| | | |
|---|---|---|
| EP | 2644438 | 10/2013 |
| EP | 2664539 A1 | 11/2013 |
| EP | 2685336 A1 | 1/2014 |
| JP | 2013-127994 | 5/2003 |
| JP | 540685 | 11/2009 |
| JP | 2013-203394 | 10/2013 |
| RU | 2232104 C1 | 7/2004 |
| RU | 2523420 C1 | 7/2014 |
| RU | 2013101094 A | 7/2014 |
| TW | 200631859 A | 9/2006 |
| WO | WO/2007/146538 | 12/2007 |
| WO | 2015026018 A1 | 2/2015 |

OTHER PUBLICATIONS

European Communication with Supplementary Partial European Search Report, dated Mar. 26, 2019, issued in corresponding European Application No. 16762677.9, 22 pages.
English translation of Taiwan Office Action from related Taiwan patent application No. 105107678 dated Oct. 23, 2019.
Israel Office Action from related Israel patent application No. 254404 dated Jan. 12, 2012 with English translation.
Taiwan Office Action from related Taiwan patent application No. 109123610 dated Jan. 13, 2021 with English translation.
Republic of China (Taiwan) Office Action and Search Report (with English translation), dated Oct. 23, 2019, in corresponding Republic of China (Taiwan) Application No. 105107678, 7 pages.
Japanese Patent Office Action issued in connection with related Japanese patent application No. JP 2017-567046 dated Mar. 17, 2020 with English translation.

* cited by examiner

AUTOMATED DRONE SYSTEMS

CROSS-REFERENCE TO RELATED APPLICATION

This is a Continuation of application Ser. No. 15/832,648, filed Dec. 5, 2017, which is a Continuation of application Ser. No. 15/068,442, filed Mar. 11, 2016, now U.S. Pat. No. 9,864,372, which claims priority to and benefit under 35 U.S.C. § 119(e) of U.S. Provisional Patent Application Ser. No. 62/132,311, filed Mar. 12, 2015 which are hereby incorporated by reference in their entirety as if fully set forth below.

FIELD

The present disclosure generally relates to the security systems for unmanned air vehicles such as recreational drones.

BACKGROUND

Security systems known are subject to cumbersome installation of constituent parts and associated static location of imagine devices (e.g. cameras) that are installed therein. Because the cameras are static and difficult to install, dark spots can be exploited by intruders. Additionally, it has been proposed to send recorded and/or streaming images to computing devices or portable computing devices such that the user of a smartphone can view information such as recorded images (or images being recorded) or messages. In this respect, portable computing devices such as smart phones or tablets have been used for storing, analyzing, and transmitting such information.

However, in order for any settings in a particular system to be manipulated (i.e. to view different cameras, move the location of a camera, or any other administrative function), an end user typically has to be near the location of the camera and/or be situated where the actual surveillance systems are located in order to make such changes permissible. It is with respect to these and other considerations that the various embodiments described below are presented.

SUMMARY

Embodiments of the present disclosure include an automated drone security system security system for surveilling a location is disclosed, the system including a drone comprising one or more onboard sensors and an imaging device for measuring surveillance data. The surveillance data may include images, telemetry data, infrared data, or other detectable information of the location to identify one or more changes associated with a particular event (e.g. a theft, a burglary, a break-in, an accident, etc), wherein the location may be understood as structure(s), building(s), parcel(s) of land, street(s), and/or the like. The drone may be capable of executing one or multiple flight operations for a period of time as well as storing and transmitting the surveillance data to a server assembly. The server assembly of the system in turn may be operable for coordinating the drone and receiving the surveillance data. A drone dock may also be included in the system for drone launching, landing, and/or storing the drone. A user computing device may also be included in the system and in communication with the server assembly and the drone, the user computing device having a non-transitory storage medium, a processor for processing data (including the surveillance data) between the server assembly and the drone, and a user interface for receiving user input and displaying data transmitted from the drone. Flight operations associated with surveilling the location may be automatically and/or manually controlled by the user computing device or the server assembly in connection with the location.

In certain embodiments, a battery of the drone may be charged by the drone dock through a conduction pad and/or through an inductive charging device. In certain embodiments, when the battery of the drone has a minimum charge, the drone may be automatically returned to the drone dock for charging. In this respect, the system may also include flight and security control logic comprising one or more of the following processes: executive logic defined by one or more predefined flight and operation procedures triggered by sensor states associated with the one or more onboard sensors of the drone including velocity, a timer, an inertial measurement unit, and/or a global positioning system (GPS); flight range prediction logic defined by a status of the battery of the drone and environmental conditions including wind speed and direction, humidity, altitude, temperature, and air pressure, and a flight trajectory planner associated with one or more flight operations; and autonomous logic associated with the flight range prediction logic including collision avoidance logic and control and encryption for information transmitted between the drone, the server assembly and the user computing device.

In certain embodiments, the collision avoidance logic may include a detect and track module associated with static and dynamic structures and obstacles defined by a predetermined location of the location being surveilled, a predetermined flight path, and/or static and dynamic structures and obstacles sensed by the onboard sensors of the drone.

The system may also include a video feed system comprising one or more of the following processes: stream quarter video graphics array (QVGA) video from an onboard computing system of the drone to a cloud server associated with the server assembly with a predetermined latency; relay QVGA video from the cloud server to the user computing device with a similar predetermined latency; and stream or upload video in a predetermined format from the onboard computing system of the drone to the cloud server, wherein the predetermined format is determined pending network bandwidth and encryption.

In other embodiments, the system may also include one or more additional drones and associated onboard computing systems with flight and security control logic, imaging devices, onboard sensors and associated sensor states. The user computing device or the server assembly may also partially or automatically manage a flight operation for surveilling the location associated with each of the one or more additional drones for continuous, uninterrupted, and/or dynamic aerial coverage of the location being surveilled.

In other embodiments, the system may also include a process for forming or monitoring a continuously-updated two-dimensional and/or three-dimensional map of the location with image stitching logic defined by two- and/or three-dimensional blending of previously and live recorded two- and/or three-dimension data gathered from the one or more onboard sensors and imaging devices of each drone. Further, one or more of the drones of the system may maintain connectivity with the server assembly or the user computing device through 3G/4G, RF, and/or a local wireless network.

In other embodiments, wherein one or more of the drones and/or the user computing device may be automatically configured based on data detected from onboard sensors of the one or more drones. Alert messages of this embodiment may also be automatically configured based on one or more predetermined detected parameters of the location being surveilled or one or more of the drones surveilling the location. In this respect, alert messages can be caused to be manually or automatically transmitted to the user computing device or other user computing devices securely connected therewith so that end-users can quickly and reliably detect that an event of interest may be occurring at the location.

The system may also include a plurality of drone docks positioned on or throughout the location, wherein each drone can be capable of being housed, landing upon, and/or receiving a charge to its battery in connection with any one of the plurality of drone docks, Each drone dock may also be wirelessly connectable to the server assembly and/or the user computing device to store and transmit data from one or more of the drones docked thereon.

In other embodiments, the user computing device may include an event scheduling manager for manually or automatically selecting one of the drones to execute one of a plurality of flight operations. Flight operations may include surveilling a specified structure of interest, surveilling a perimeter, surveilling a pattern across the entirety of or a portion of the location being surveilled, surveilling the location for a duration of time at a specified altitude, or any other operation consistent with providing dynamic yet accurate aerial surveillance coverage.

The user computing device of the system may also include an event viewer for live viewing the flight operation being executed by drones of the system and/or for viewing previously captured data by drones of the system. The user interface may also display operational status of the drone.

The server assembly may include a database server operatively connected to one or more web servers across one or more networks, each server operable to permanently store and/or continuously update a database of master surveillance data, telemetry information, mission data, collision mapping, drone coordination, air traffic control, captured images, and video streams. The server assembly may also include a stream server for live video and image streaming and/or a notify server for automatically transmitting alert messages between the drones, the user computing device, and the server assembly. In this regard, a web service may also be dynamically provisioned pending network bandwidth associated with the one or more networks, encryption, and the video and image streaming.

One or more drones of the system may also operate according to one or more of the following states: a non-operational state defined by being docked on the drone dock; a charging state defined by receiving a charge on the drone dock; an on-duty state when the drone is executing the flight operation; and/or a malfunction state when the drone is malfunctioned and needs to be repaired.

In other embodiments, a mobile device comprising a software application is disclosed with access to any of the herein disclosed drone security systems. In this respect, the mobile device may be in communication with the server assembly and one or more drones and the mobile device may include a non-transitory storage medium, a processor for processing data transmitted between the server assembly and the drone, and a user interface for receiving user input and displaying data transmitted from the one or more drones.

The software application of the mobile device may include the following management capabilities: continuously monitoring the location by forming a continuously updated surveillance map and one or more live streams of the location; configuring alert message parameters for transmitting one or more alert messages and recipients of the one or more alert messages; manually and/or automatically selectively viewing the one or more live streams; deactivating and/or reactivating one or more drones; controlling one or more parameters of the onboard sensors of the drone including minimum thresholds for a predetermined alert or pan, zoom, tilt, direction, and frames per second for the imaging device; and/or activating one or more alarm conditions on one of the onboard sensors or the imaging device.

Other aspects and features of the present disclosure will become apparent to those of ordinary skill in the art, upon reviewing the following detailed description in conjunction with the accompanying figures.

DESCRIPTION

Figure 1:
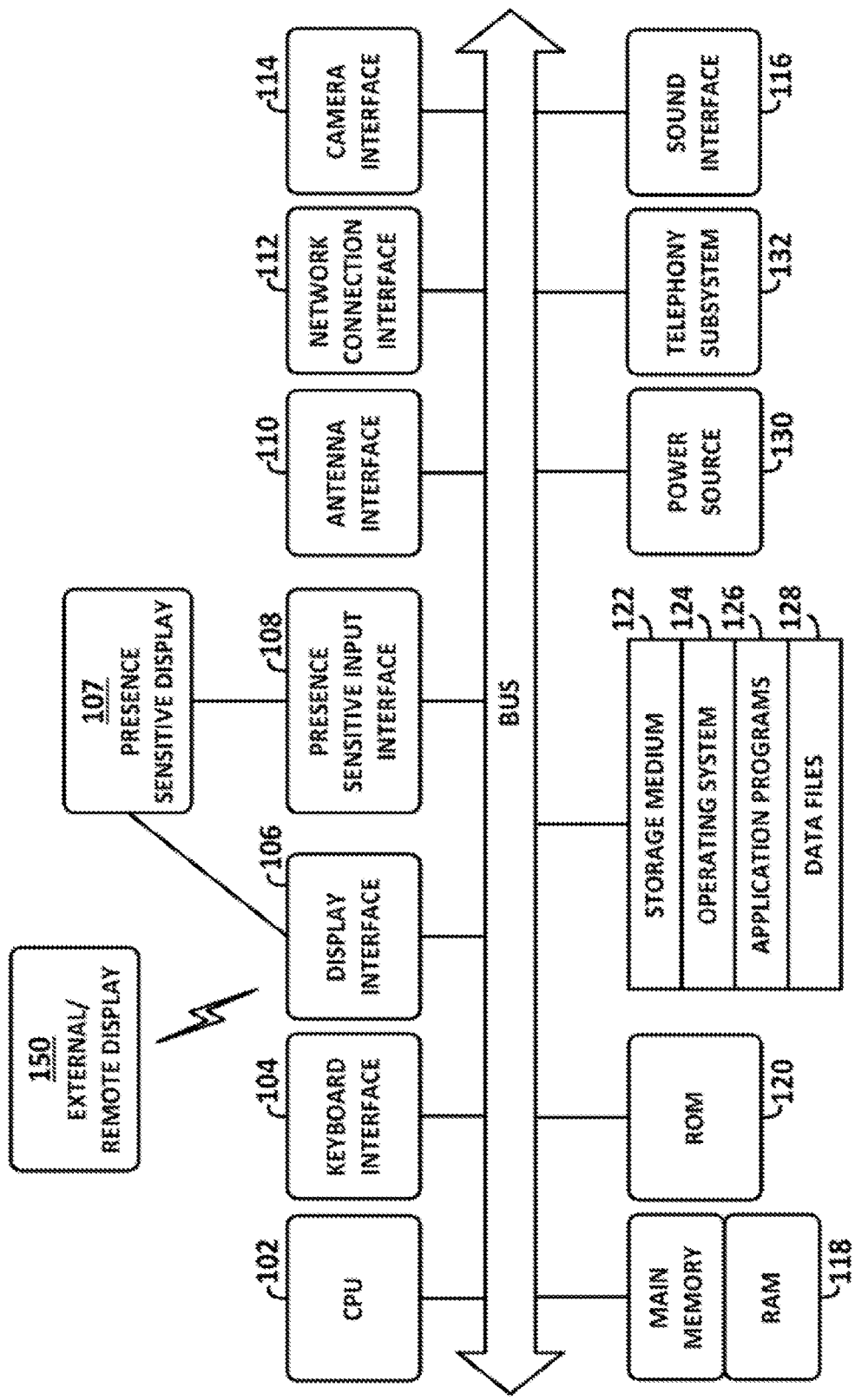
FIG. 1 depicts a block diagram of an illustrative computing device architecture used in combination with the herein disclosed automated drone security system, according to an example embodiment.

Throughout this disclosure, certain embodiments are described by way of example in relation to designing, operating, and maintaining an automated drone security system. However, embodiments of the disclosed technology are not so limited, and may be applicable to other manually operated and autonomous mechanical craft. Some embodiments of the present disclosure will be described more fully hereinafter with reference to the accompanying drawings. This present disclosure may, however, be embodied in many different forms and should not be construed as limited to the embodiments set forth herein.

In the following description, numerous specific details are set forth. However, it is to be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the present disclosure so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. Accordingly, "a drone" or "the drone" may refer to one or more drones where applicable.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, the term "drone" may refer to, or be used interchangeably with, "unmanned aerial vehicle" (UAV) or "radio-controlled" (RC) aircraft where appropriate.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, tablet, terminal, display device, or some other like terminology. In other instances, a computing device may be a processor, controller, or a central processing unit (CPU). In yet other instances, a computing device may be a set of hardware components.

Various aspects described herein may be implemented using standard programming and/or engineering techniques to produce software, firmware, hardware, and/or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as streaming video or in accessing a computer network such as the Internet or a local area network (LAN). Of course, a person of ordinary skill in the art will recognize many modifications may be made to this configuration without departing from the scope or spirit of the claimed subject matter.

System Overview

The present disclosure solution systems, methods, and computer-readable mediums for providing an automated drone security system 200. According to an example embodiment, the system 200 may have one or more of the following features or meet or exceed one or more of the following requirements. In certain examples, the system 200 may include video streaming including video feeds that may be accessed or streamed through software resident on a computing device (e.g. a mobile app). The solution may be operable to provide a user capability of viewing the video feed in real-time or with a predetermined delay such as 2 seconds. The predetermined delay may also be adjustable as needed or required.

In a preferred embodiment, the video feed of system 200 may include the following processes: Stream Quarter Video Graphics Array (QVGA) video from an onboard computer to a cloud server with limited latency (e.g. less than ~1 sec latency); relay QVGA video from the cloud server to a user's app on a mobile device with a similar limited latency (e.g. less than ~1 sec latency); stream or upload video in a predetermined format (e.g. High definition) from the onboard computer to the cloud server, wherein the stream, upload, and/or the video format is executed pending network bandwidth; and/or one-to-many broadcast of HD video from cloud server with ~1 sec latency; and/or Encryption.

System 200 may also include executive flight control logic and flight system security considerations that include the following processes. High-level executive logic may include state machine with predefined flight and operation procedures, wherein certain flight and operation procedures may be triggered by sensor states such as timer, measurements from an inertial measurement unit (IMU), a global positioning system (GPS), velocity, atmospheric conditions, or the like. Flight range prediction logic may also be included based on battery/system status and environmental conditions. Autonomous RTL logic may also be included for leveraging flight range prediction. Other logic included in system 200 may include flight trajectory planner with collision avoidance and control and status communication encryption for security.

System 200 may also include capabilities to coordinate multiple drones and/or multiple simultaneous flights with overlapping operations or missions to relay surveillance coverage. Multi-drone relay missions may be motivated by battery constraints of single drones and may also be include capabilities for web-based multiple drone registration with a cloud-server-based drone flight coordinator. The cloud-server-based drone coordinator may include partial or complete automated coordination capabilities. Finally, multi-drone control features of the herein disclosed system 200 may include capability of relaying multiple drones for continuous aerial missions.

The solution 1 may also include environment mapping capabilities including capabilities for dynamically updating a global map using flight data, wherein the flight data. Map types may include weather, no-flight zone, flight corridors, ground levels and flight ceilings, or the like. Map types may also include static obstacles, dynamic obstacles, network connectivity, and/or custom user-specified cost function map(s).

In certain examples, the herein disclosed system 200 may also include image stitching logic comprising processes for two-dimensional and/or three-dimension processing that forms a map with detected environment, obstacles, or the like that is continuously refined as new images are processed. Such data may be transmitted from sensors that are mounted to gather real-time images and data that are stitched together in two- to three-dimensions. For example, a three dimension obstacle map may be included with the map for obstacle avoidance, path planning, and intelligent navigation.

The image stitching process may include continuous updated and processing of image scans from one or more sensors on the drone to extract one or more features such as environment, obstacles, dock(s), property boundaries, structures, etc. to form the map. As the disclosed system 200 continues to received image scans from one or more sensors on the drone, values associated with the one or more features may be blended with earlier images scans and be updated and/or matched against earlier image scans to determine whether any changes have occurred that necessitate further investigation or action from the system 200.

System 200 may also include one or more basic safety behaviors such as manual emergency stop (e-stop) for drones. Multiple e-stop behaviors including RTL and/or power cutoff. The one or more basic safety behaviors may also be operable to wirelessly maintain heartbeat connectivity with one or multiple drones through 3G/4G, Wifi or RF at all times. In the event that connectivity with the drone is lost or system status signals indicate inability to continue mission, the drone may be operable to autonomously navigate back to the dock. Additionally, the user of the system 200, including an air traffic controller or coordinator, may react accordingly in order to execute an automatic, partially automatic, and/or manual return of the one or more drones back to the dock. In this respect, the solution 1 of the herein disclosed system 200 may include customizable triggers or conditions for e-stop (e.g. a programmed detection of unusual activities).

System 200 may also include network security with operability for encrypted communication for navigation and control signals. The network security may also include operability for encrypted communication for video streaming and/or flight sensor data acquisition. Various systems, methods, and computer-readable mediums may also be utilized for providing the herein disclosed automated drone security system 200, and will now be described with reference to the accompanying figures.

Front-End System

Figure 2:
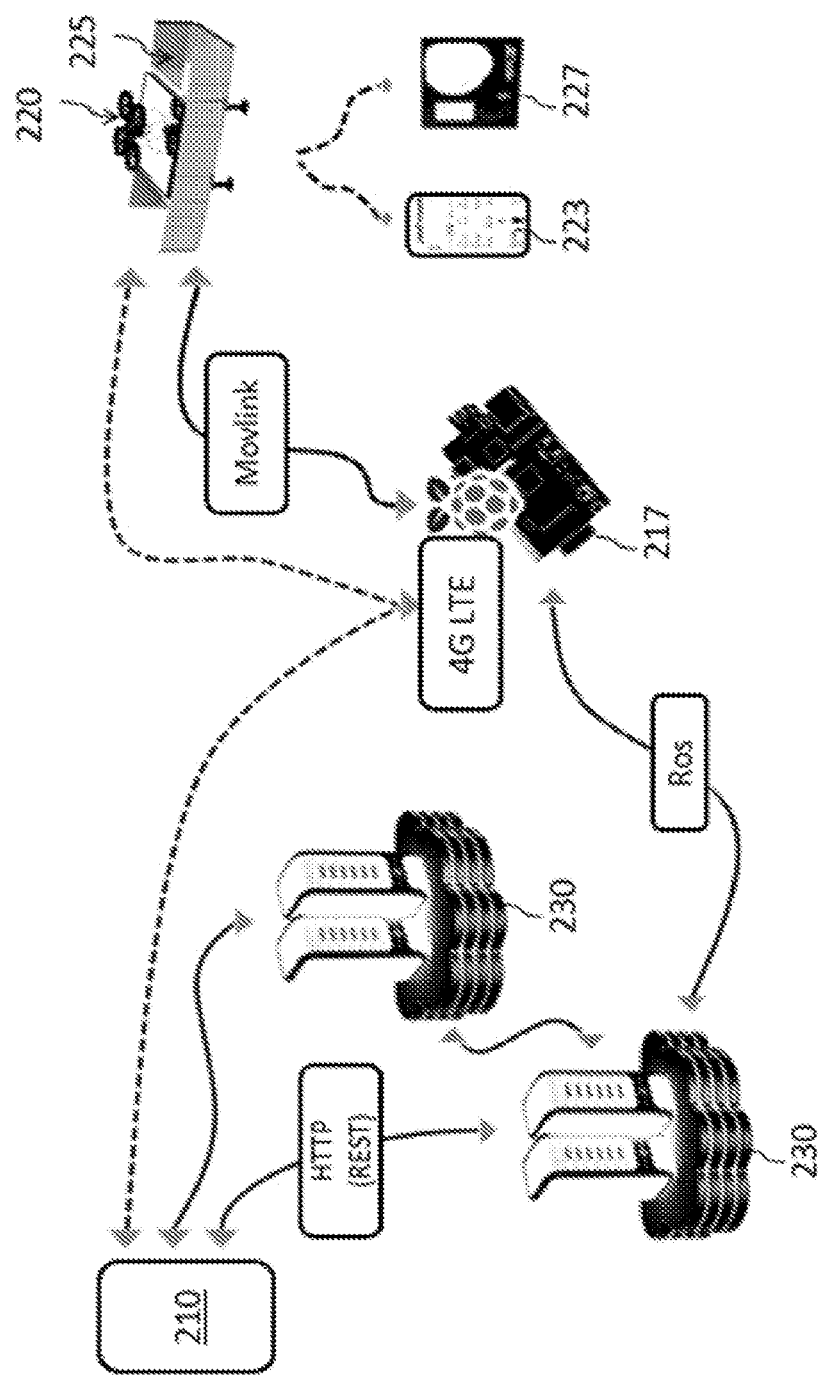
FIG. 2 depicts an illustration of the automated drone security system architecture according to an example embodiment.
Figure 3:
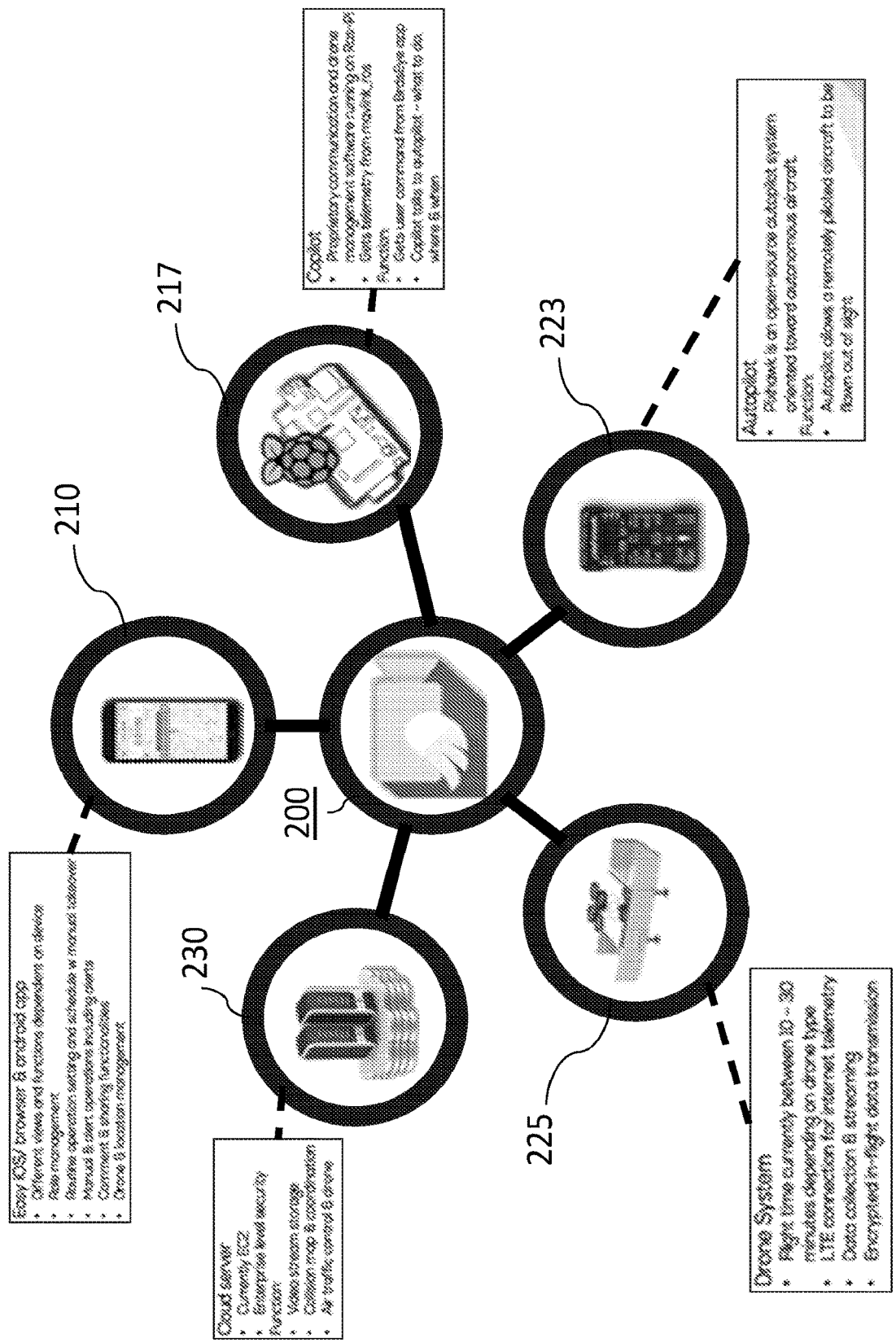
FIG. 3 depicts an illustration of features of the automated drone security system, according to an example embodiment.

FIG. 2 depicts an illustration of the automated drone security system architecture according to an example embodiment. According to certain embodiments, security system 200 may comprise a user-facing front-end 210 including software, firmware, and/or hardware for monitoring and/or controlling a drone 220. In some embodiments, this interface to the user may comprise a mobile application ("app") 215a or other software executable on a mobile computing device 210 (e.g. a smart phone). In another embodiment, the interface may comprise a web-based application 215b accessible through a browser or other software, or a desktop application.

In some embodiments, the mobile app 215a may include a client for managing one or more locations being secured by drone(s) 220 of system 200. A location may be configured with one or more of the following parameters: geo-fence (e.g., a two- or three-dimensional structure defining borders of the location); buildings (e.g., polygons with specified height); obstacles (e.g., polygons with assumed infinite height, effectively no-fly zones, etc.); markers (e.g., map markers identifying points of interest); and/or bases/docks 225 (e.g. map markers identifying locations of drone docks 225).

System 200 may also include several drones 220, wherein each drone 220 may be assigned to a specific dock 225, or to multiple docks for dynamic operations. In some embodiments, additional capabilities of app 215a/215b or other software may be available dependent on the drone 220 to be controlled or the characteristics of dock 225, device 210, and/or the associated server assembly. In an example embodiment, the app 215a/215b may determine the capabilities of a host device executing the software and configure itself accordingly. In another embodiment, the app 215a/215b may configure itself based on a configuration of the drone 220 to be controlled. Alternatively, the software of may come preconfigured for a particular host device, a host or target drone that can be defined by the end-user, or for a particular target drone.

In some embodiments, the app 215a/215b may provide or support functionality permitting drone 220 and location management. Moreover, the app may provide routine operation setting and scheduling with manual takeover of drones 220, role management, alerts during manual and automated control; and/or comment and sharing functionalities.

According to certain embodiments, the app 215a/215b may present information about associated drones 220 in a dashboard view. In an example embodiment, the operational status and/or battery charge of a drone 220 may be displayed and/or other displayable information may include drone destination, position, speed, heading, and altitude. Selecting a drone user interface item may bring up a view with editable details and controls to manage status of the drone 220 and assign it to a dock 225 or to execute one or more predetermined operations.

In some embodiments, the app 215a/215b may present information about currently running operations in the dashboard view. In an example embodiment, the operations may be grouped by location and/or one or more indication of each operation item may include a periodically updated image from the live video feed associated with the operation. A user may access an operation broadcast view by transmitting input through the user interface of the app 215a/215b (e.g. tapping or clicking-on or otherwise selecting an operation item).

In some embodiments, the user may receive notifications (e.g. alert messages) indicating the status of one or more current operations. For example, when a new operation starts, the user may receive a notification through app 215a/215b. Forms of notification include app notification within the app itself, email, and messaging (e.g., SMS, MMS, etc.). In some embodiments, multiple users may communicate with each other through a messaging interface of the app 215a/215b and/or other software. Through or outside of the messaging interface, users may be granted permission to view one or more live video feeds and operational statistics associated with the drones owned or operated by other users. In an example embodiment, a first user may provide a link to a video feed of drone operation underway to second user. The second user may follow the link to launch a live-broadcast interface showing a live view from the associated drone. Operations may be launched from the dashboard of app 215a/215b or the like.

In some embodiments, a suitable drone 220 may be selected for an operation automatically based on one or more operation parameters and status of available drones. A drone may also be selected based on factors such as proximity to one or more predetermined locations, battery status, size of a particular drone for a particular operation, range of the drone, speed of the drone, payload capability of the drone, or other factors.

Figure 11B:
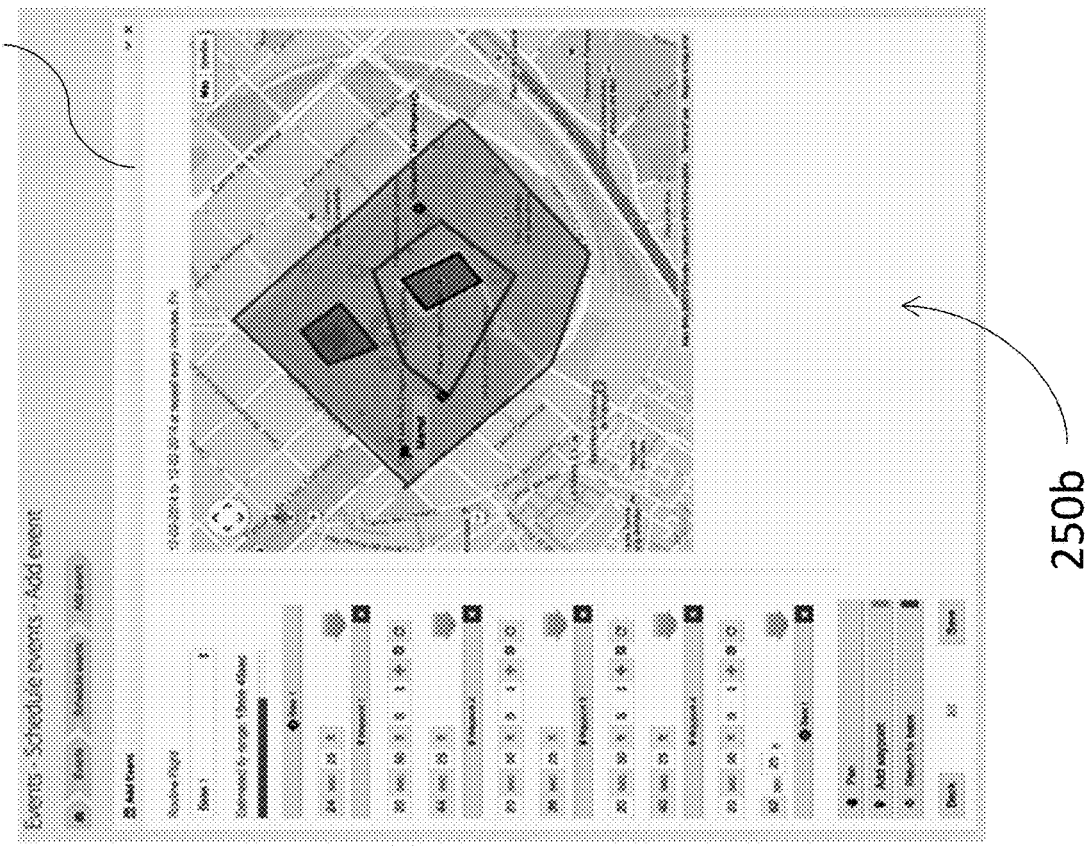
FIG. 11B depicts an exemplary event scheduler of a web-based app.
Figure 11A:
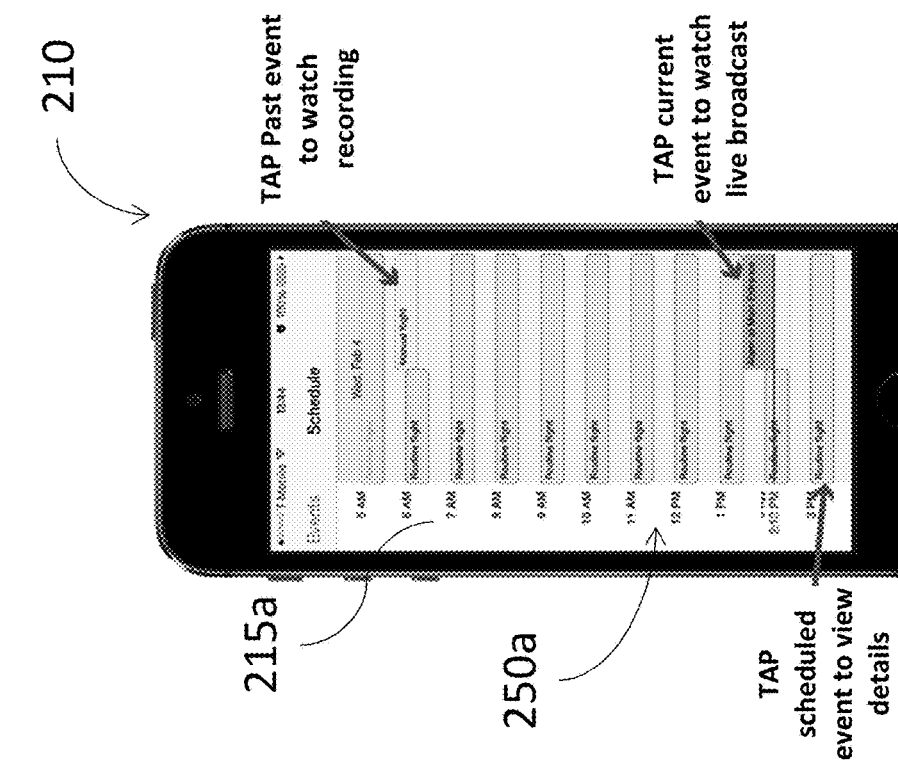
FIG. 11A depicts an exemplary event scheduler of an app on a mobile device.

According to certain embodiments, the interface of the app 215a/215b may also provide a calendar or other scheduling interface for managing one or more operations. For example, FIG. 11A describes an embodiment of app 215a on device 210 depicting an exemplary event scheduler 250a whereas FIG. 11B similarly depicts app 215b and an exemplary event scheduler 250b. Either event scheduler may schedule operations and may also be configured to repeat one or more operations on specified intervals during a time period (e.g., every hour from 8 am to 4 pm), on specific days (e.g., every Monday-Friday), or periodically (e.g. once every 4 weeks, every 2 months, etc.). One or more flight paths associated with a particular operation may be configured in advance by placing a plurality of waypoints on one or more maps. Components of the system 200, including app 215a/215b, may ensure that the flight path does not exceed a certain maximum duration, range, or other performance parameter, for example, a "safe" drone flight time. Users may also be able to view a list of recordings arranged by time and date. In some embodiments, the scheduling interface may include search functionality to improve ease of use as well as facilitating repeatability of one or more previously executed operations.

Figure 12B:
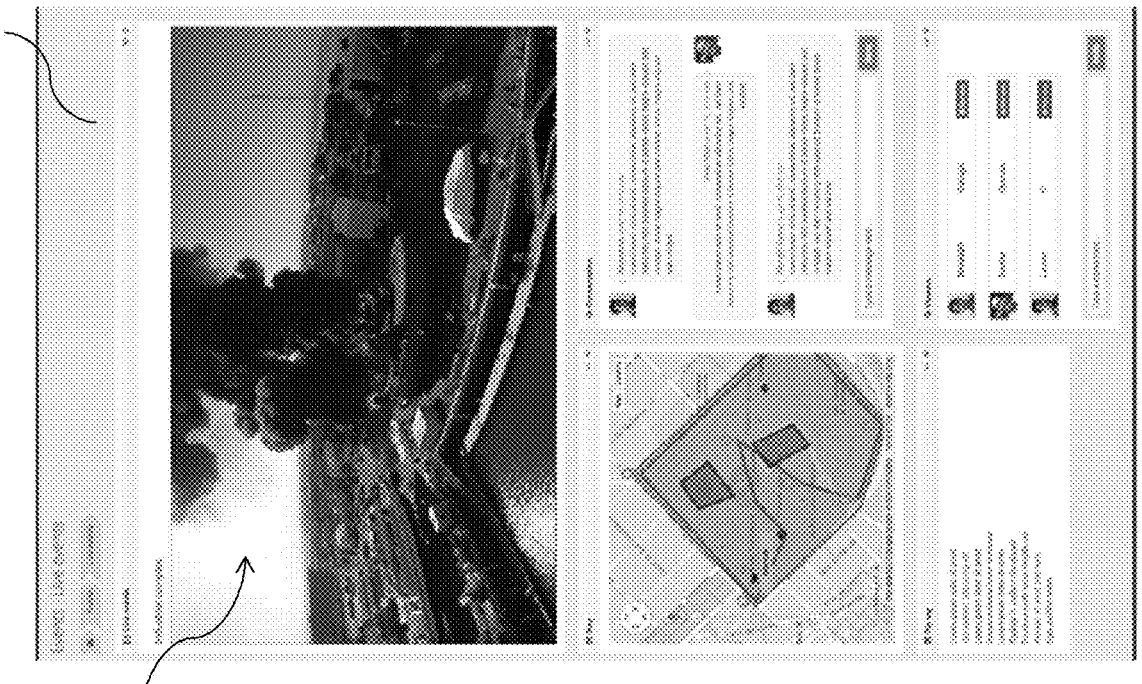
FIG. 12B depicts an exemplary event viewer of a web-based app.
Figure 12A:
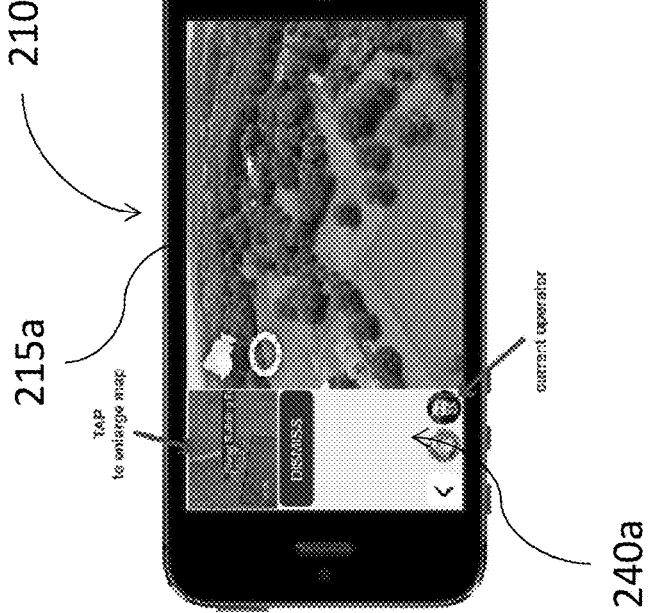
FIG. 12A depicts an exemplary event viewer of an app on a mobile device.

According to certain embodiments, the app 215a or 215b may include a playback interface for viewing captured video and other recorded data. For example, FIG. 12A describes an embodiment of app 215a on device 210 depicting an exemplary event viewer 240a whereas FIG. 12B similarly depicts app 215b and an exemplary event viewer 240b. This is particularly useful where a particular structure or object can be monitored to mitigate damage or losses associated with accidents as seen in FIG. 12B where a structure is on fire. In this instance, users may be able to immediately respond or the system 200 may be configured to automatically detect episodes as in FIG. 12B and coordinate with appropriate response personnel. The playback interface of each viewer 240a and 240b may be similar to a live-broadcast interface, however, the user may be able to control the playback position in the former.

Users may also be capable of appending a description, a title, or other notes to the recordings. Users may also be able to utilize viewers 240a and 240b in combination with one or more maps and such appended information may be viewable as part of the list of recordings. In another embodiment, the app may launch or trigger another application on the host device for viewing content. A user may also share recordings with other users through the app 215a and 215b. In some embodiments, a user may be able to tag and share only desired portions of recordings such as clips of interest.

Figure 8:
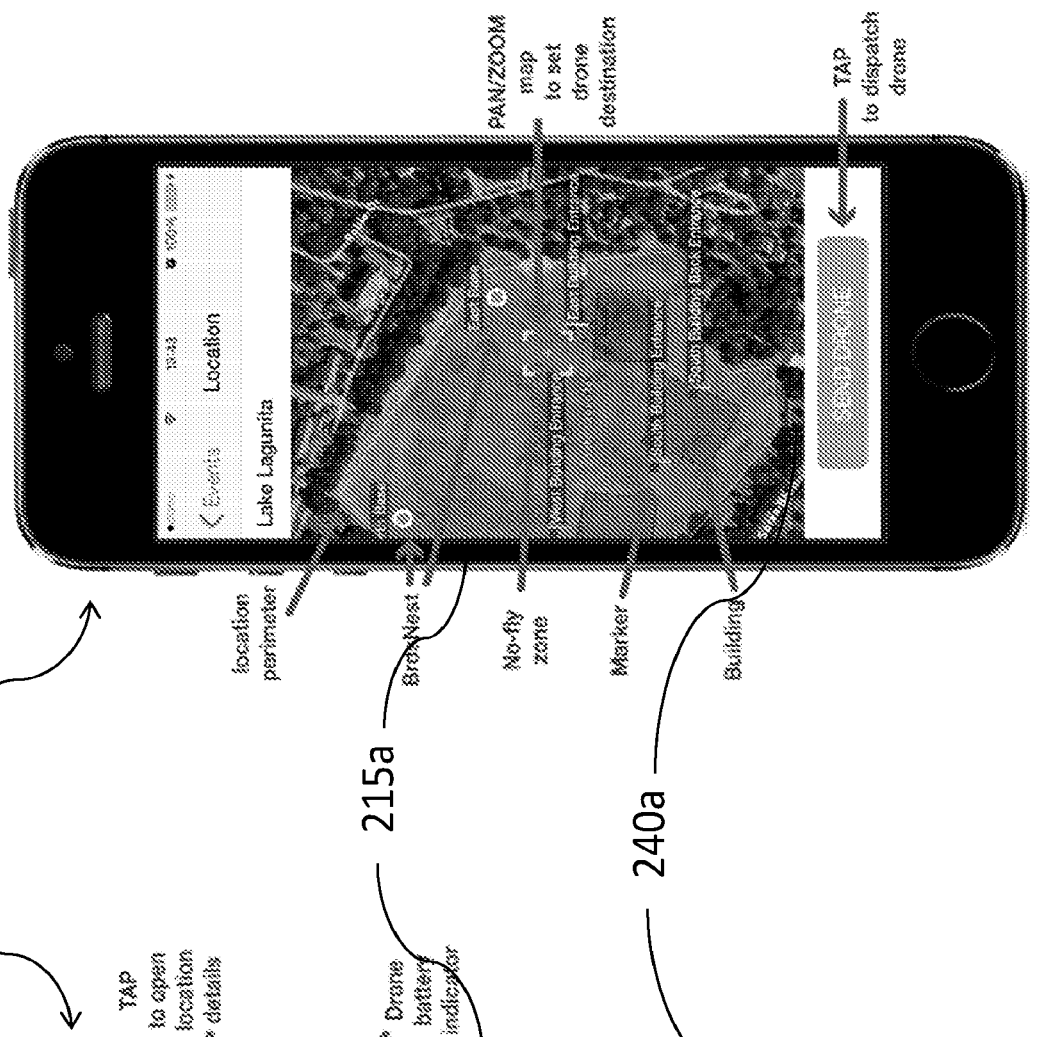
FIG. 8 depicts an exemplary event viewer of an app on a mobile device.
Figure 7:
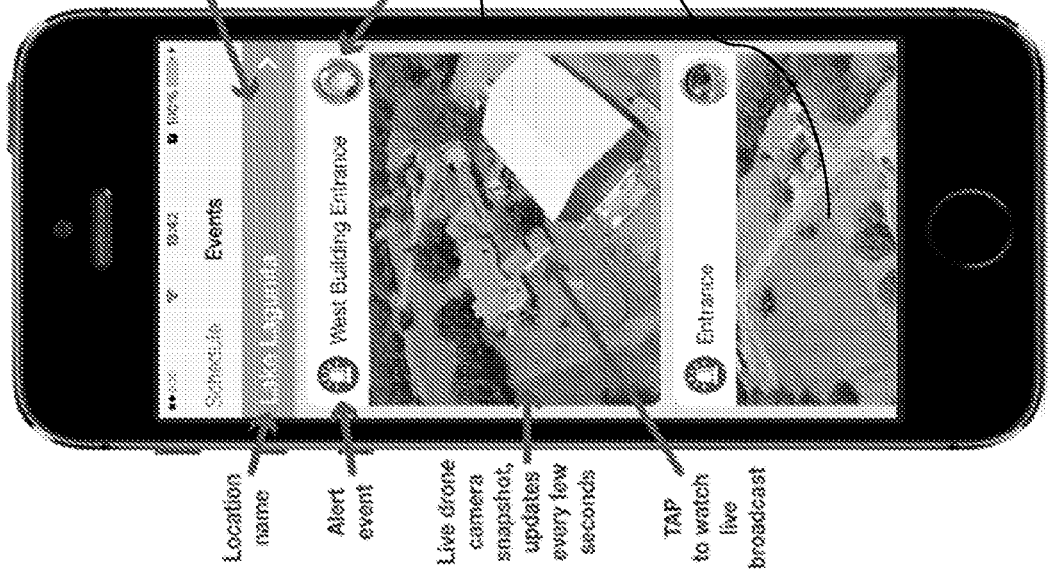
FIG. 7 depicts an exemplary event viewer of an app on a mobile device.

Additionally, in regards to live viewing, as seen in FIGS. 7-10 which depict exemplary live or previous event viewers 240a, app 215a on device 210 that may include different controls and indicators for system 200 and corresponding end-users. For example, in FIG. 7, viewer 240a is shown displaying information related to an event entitled, "Lake Lagunita", wherein one or more alerts have been defined with information related to an "alert event" that earlier took place at a predetermined location, "West Building Entrance". Information may be compiled associated with the event of FIG. 7 including a combination of videos, photos, location, and the like. Similarly, FIG. 8 depicts information related to the vent of FIG. 7 as seen in app 215a of device 210 with information related to a plurality of locations associated with the location of FIG. 7, including nest 225, one or more markers associated with the location, building, a perimeter of the location, and the ability for system 200 to dispatch one or more drones 220 to execute a path, go to a location, or carry out one or more operations.

Figure 10:
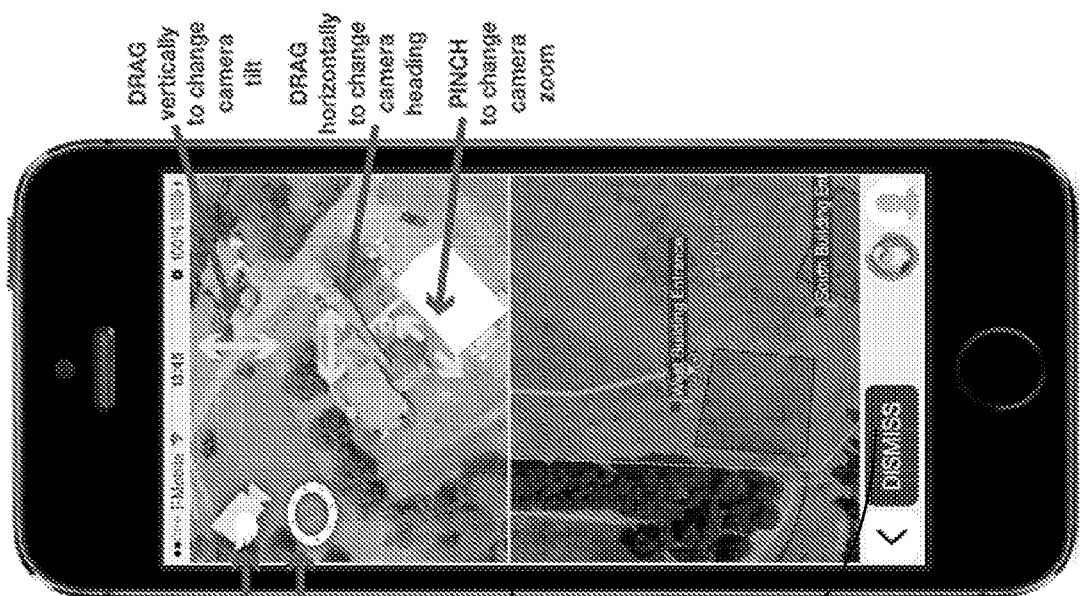
FIG. 10 depicts an exemplary event viewer of an app on a mobile device.
Figure 9:
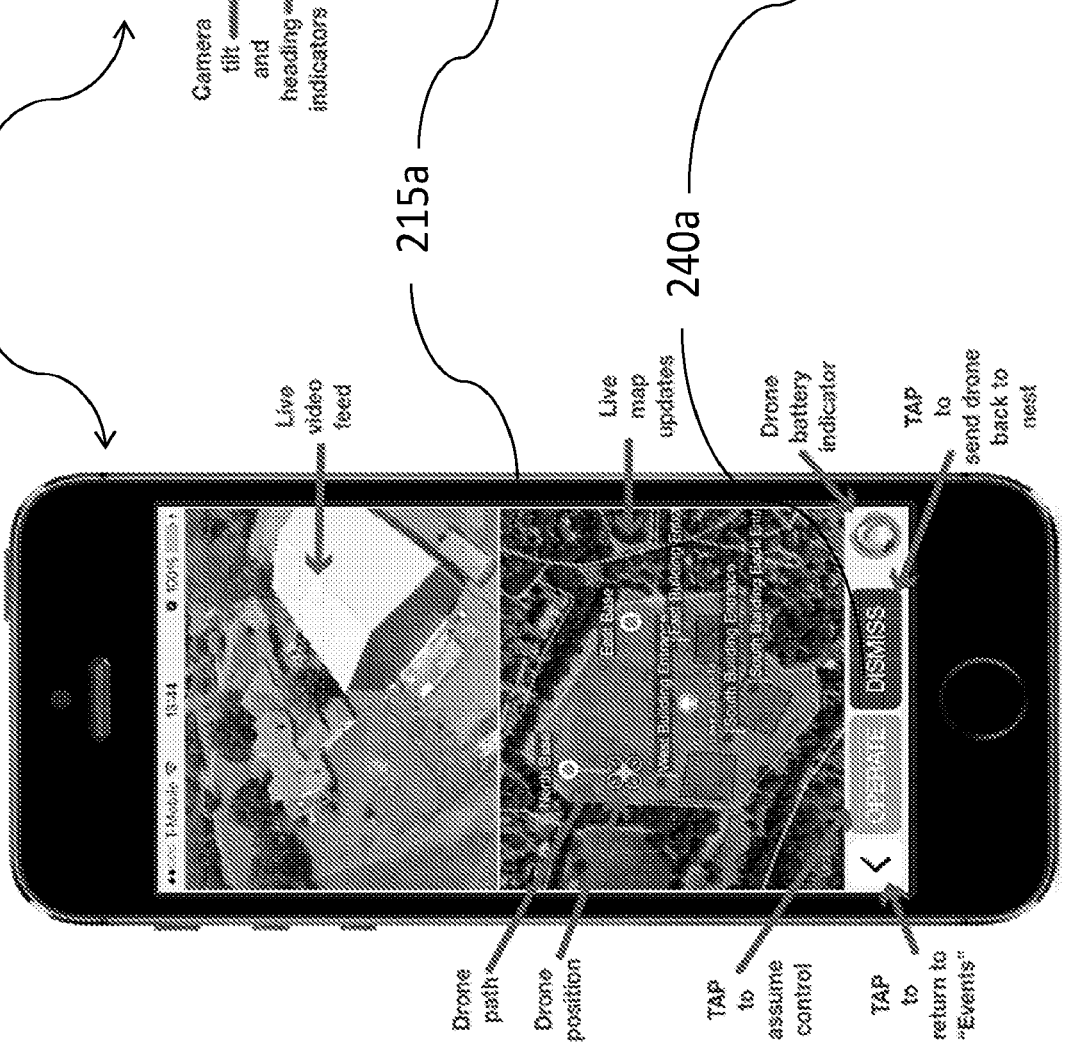
FIG. 9 depicts an exemplary event viewer of an app on a mobile device.

Similarly, FIG. 9 depicts a view one or more maps in app 215a that show live video feeds as well as path of one or more drones 220 of system 200. In this respect, a user may select which drone 220 to operate, which operation to execute as well as access information related to operational status, position, path, battery, or the like. Similarly, as seen in FIG. 10, app 215a may be capable of imparting image and/or video control to end-users. For example, through the app 215a a user may manually or the system 200 may automatically control camera tilt, heading and/or pinch for cameras of drone 220 between a plurality of orientations and positions.

Back-End Architecture

According to certain embodiments, the drone security system 200 may comprise a back-end including one or more servers 240. A server 240 may perform various functions including collision mapping, drone coordination and air traffic control as well as storage/processing of captured images and video streams. In one example embodiment, the back-end architecture may comprise, or be in communication with, one or more of a database server, web server, drone coordination relay, stream server, notify server, and/or a scheduler. In some embodiments, this functionality may be split between multiple servers, which may be provided by one or more discrete providers. In an example embodiment, a web service for hosting computer applications or other cloud computing resource may be dynamically provisioned to match demand and ensure quality of service of the drone security system 200. For example, the drone security system 200 may be compatible with the Amazon EC2 cloud computing platform.

Database Server

According to certain embodiments, the above-described database server may store master data, telemetry information, and mission data as well as logging and trace information. Software of the database server may be based on the object-relational database system PostgresSQL the database server is not so limited other approaches may be used as needed or required. This database system is not limited to only organizing and storing data and instead, it may be also used to eliminate a need of having an application server (e.g. 2nd Layer). In some embodiments, almost every functional requirement may be realized by using the database's programming language, PL/pgSQL. The database may also provide an API to the web server for data interchange based on JSON specifications. In some embodiments, the database may also directly interact with the described drone coordination relay to control and track one or more drones 220.

According to certain embodiments, the database server may be optimally designed for storing large amounts of data, responding quickly to incoming requests, having a high availability and historizing master data. In an example embodiment, the database server may store ten megabytes of raw data (e.g. data related to telemetry and tracking), as well as 200 megabytes of video material (e.g. per drone 220). To handle this amount of data, a sophisticated combination of table partitioning, table inheritance as well as database clustering may be implemented to fulfill these requirements.

Mission Control Module

Figure 4:
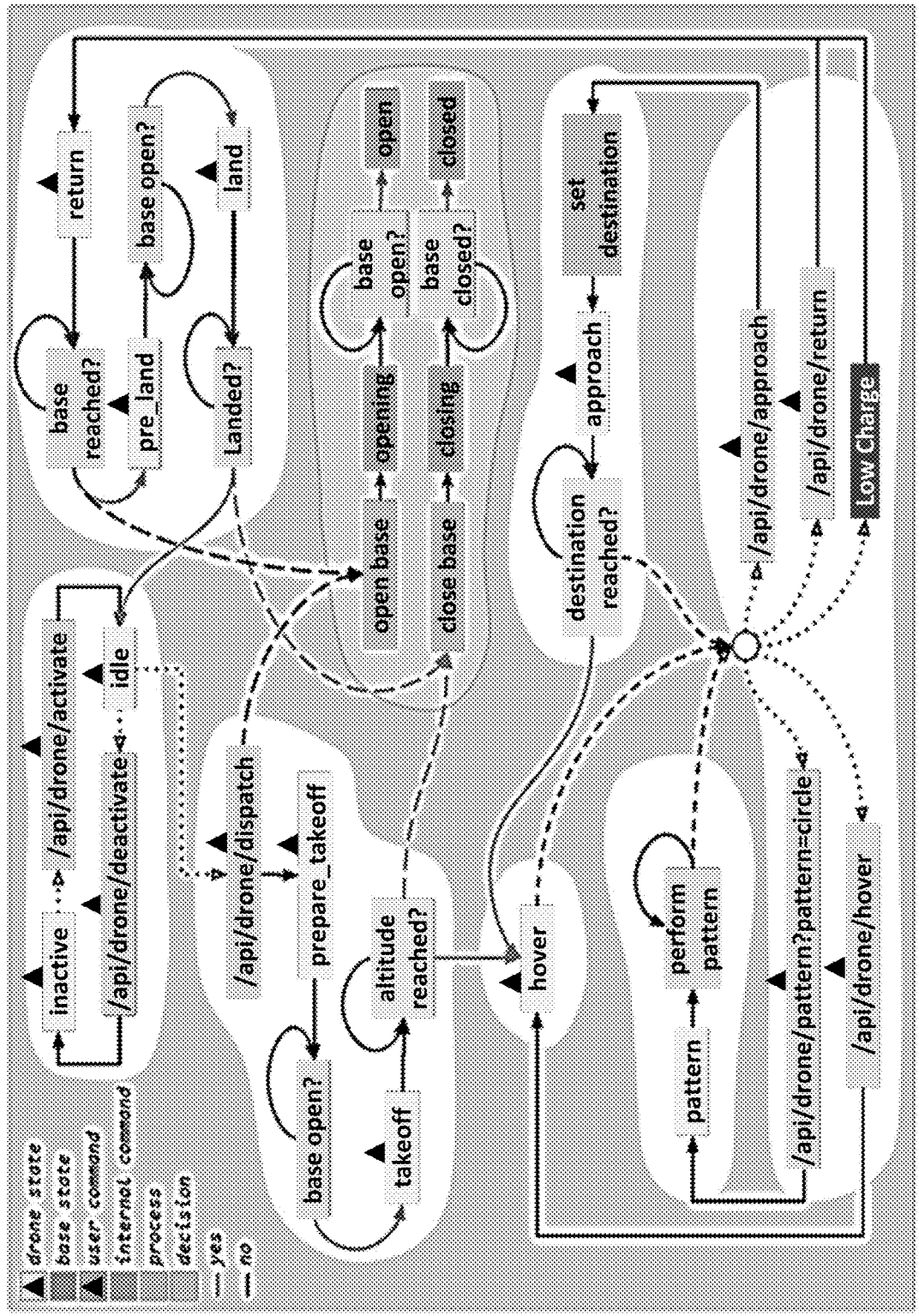
FIG. 4 depicts an illustration of drone state transitions during an exemplary mission, according to an example embodiment.

According to certain embodiments, the mission control module may be part of the database backend. FIG. 4 depicts an illustration of drone state transitions during an exemplary mission, according to an example embodiment. The states marked with triangles, including drone states and user command states, are handled by the Mission Control Module. In some embodiments, the mission control module may perform one or more of triggering one or more scheduled missions, dispatching a drone 220 on a mission, ordering control of operations, status tracking of a drone 220 during missions, accepting and delivering operator instructions, finalizing and archiving missions and mission data, as well as ensuring operation safety as the drone 220, other drones 220, and other static and dynamic objects.

This module may directly interact with the drone coordination relay and/or drone navigator process and may also control these components based on mission-specific requirements, sensor data, drone states, state transitions, or the like. The mission control module may also handle states like low battery, failover in case of unresponsive backend hardware and malfunctions indicated by the drone 220 itself. In some embodiments, this module may include logic for collision avoidance.

Web Server

In an example embodiment, the web server may be a standard component based on Apache Web Server and PHP or the like. For availability and performance reasons the load may be balanced across multiple nodes.

Drone Coordination Relay

According to certain embodiments, the drone coordination relay may directly interact with the database server. For example, if a mission is scheduled, manually or automatically, the database server may cause the drone coordination relay to dispatch a mission at drone coordination and fork a drone navigator process. This process may run independently from the drone coordination relay and/or take over the following tasks, including, reading the status from the drone periodically (e.g., every two seconds) and write the status to the database backend. The periodic reading may be customizable so that reading is done more quickly or more slowly depending on bandwidth, storage capabilities, or user preference. The database may also return with the next instruction to proceed (e.g., a next waypoint to approach).

When an instruction is given by the database backend, the drone navigator process may contact the drone coordination to initiate the desired action. This action may be, for example, to fly to a new destination, to fly a pattern at the current position, or to tilt the camera. If the database backend indicates that the last waypoint has been reached, then the drone navigator process may initiate a return-to-landing procedure. After the drone has landed and switched back to an "idle" state, the process may finish. When a mission starts again the drone coordination relay may fork a drone navigator process and/or also a streaming server process. In some embodiments, the drone coordination relay may be programmed using Shell Scripting Language.

Stream Server

According to certain embodiments, the Streaming Server Process may receive the video from one or more cameras of the drone and multiplex it to connected consumers. Additionally, the Streaming Server Process may take periodic snapshots of the video and store the video on disk. If a mission has ended, the Streaming Server Process may archive the video and register the file in the database. Afterwards the Streaming Server Process may end.

Notify Server

According to certain embodiments, the Notify Server may send notifications to the user including instant messages within the app, SMS messages, and/or emails to user devices like mobile phones, tablets, laptops, personal computers and other computing devices. If a predetermined condition is recognized at the database backend (e.g. a predetermined level in a battery of the drone or sensory level from an onboard infrared sensor indicating a change in environment of a location be surveilled), an instant message may be triggered and delivered by the Notify Server.

Scheduler

According to certain embodiments, the Scheduler may automatically start and reschedule repetitive missions. The scheduler may also observe the status of drones currently not airborne and execute the pending backlog of the Drone Coordination Relay. Moreover, the scheduler may initiate daily maintenance operations on the database and the operating system. In some embodiments, daily maintenance on the database may include one or more the following tasks: 1. Reorganizing tables; 2. Computing table statistics for better performance; 3. Truncating outdated protocol data; 4. Creating new partitions; and/or 5. Backing-up of the database.

Drone Architecture

According to certain embodiments, the drone security system 200 may include, or be configured to operate with, one or more drones 220. In some embodiments, the drone security system 200 may be compatible with multiple drones 220 of various makes, models, and capabilities.

An exemplary drone 220 useable with the drone security system 200 may meet one or more of the following criteria: 1. Flight time/range: a fully charged drone 220 may be able to fly for 10-30 minutes depending on drone type; 2. Loiter time: drone loiter time at each waypoint may be independently configurable; 3. Camera focus, tilt, and zoom control: camera may be controlled via app; 4. Safety systems: deployable parachute, radio-based self-position broadcast, emergency landing system, and e-stop functionality; and/or 5. System redundancy: drivetrain hardware, communication hardware, onboard computation hardware, and onboard sensors (e.g. IMU, GPS) may have backups or be able to perform in a reduced capacity.

In some embodiments, a drone 220 may also support wireless, mobile, and/or satellite network connections. For example, a drone 220 may communicate telemetry and video data via LTE connection. Encryption or other technology may also be used to secure communications to and from drone 220.

In some embodiments, the drone 220 may include one or more multiple sensor devices such as a camera or other image capture device, an infrared sensor, Optical, multispectral, hyperspectral, laser, and optical SAR technologies, gas sensors, or the like mounted thereon. In those embodiments where drone 220 is equipped with a camera, the camera may be permanently affixed or removably attached. The camera may capture images and/or video of the drone 220's surroundings. In some embodiments, the captured video or images may be streamed live from the drone 220 through the backend to the app. In another embodiment, the content may be streamed from the drone 220 to the Copilot or device hosting the app software, or to the Copilot and then to the app over another network or connection. In another embodiment, the drone 220 may save video locally to an on-board memory or other storage and/or remotely save captured content to an external storage medium. The captured content may later be retrieved from the drone 220, the external storage medium, or the like, for example, after landing in a nest, or other docking station.

In some embodiments, the drone 220 may be able to automatically change the resolution, frame rate, or other quality of video or images being captured. For example, a drone 220 may typically capture video at a first resolution for streaming or local recording. When an area of interest appears or a particular event or condition is satisfied, the drone 220 may switch to capturing video at a higher resolution. This change in quality may be triggered manually by the user, or occur automatically in response to an event. For example, higher quality capture may be activated responsive to detection of activity by one or more sensors such as a sudden change in temperature or ambient noise level that can cause a drone 220 to change a quality of capture.

In some embodiments, the drone 220 may be equipped with a variety of additional sensors, including but not limited to, accelerometers, gyroscopes, altimeters, barometers, microphones, temperature sensors, thermal optics, and location sensors. Data provided by some or all sensors of drone 220 may be transmitted back to a front-end or back-end computing device for presentation to a user and/or processing/storage. According to certain embodiments, a drone 220 may operate according to one or more of the following states: in storage (e.g. drone 220 has not been assigned to a base, non-operational); charging (e.g. drone 220 is assigned to a base and is docked and charging); on duty (e.g. a drone 220 is currently flying a mission); malfunction (drone 220 has malfunctioned and needs to be repaired); and in repair (drone 220 has been unassigned from its base and is being serviced).

According to certain embodiments, a drone 220 may also engage in one or more of the following operations: manual (e.g. a user manually dispatches a drone 220 to a specified coordinate using the app); alarm (a drone 220 is automatically dispatched to where an alarm was triggered); and scheduled (e.g. routine drone 220 flights are dispatched automatically in predefined intervals).

In some embodiments, a user may launch a manual operation as well as assume manual control of ongoing alarm and scheduled operations. During manual operation, only a single user may have manual control of an operation. In an example embodiment, only the current operator may dismiss, end, edit, and/or suspend a manually controlled operation. In some embodiments, an operator may prompt another user to assume manual control or assign manual control to another user. In another embodiment, a user with sufficient privileges may override a current operator and assume manual control themselves without permission.

During manual operation, a user may send a drone 220 to a plurality of coordinates by interacting with the map, as well as controlling the camera pan, tilt, and zoom using gestures, a mouse, or other input device. After dismissal or completion of an operation, the drone 220 may autonomously return to its dock or base or another predetermined position. In some embodiments, an operation may be automatically dismissed if one or more predetermined conditions are satisfied such as the battery charge of a drone 220 being low, or the drone 220 is otherwise forced to retire. An operation may also be assumed by second drone 220 when a first drone 220 is forced to retire. This relay may be performed with minimal or no interruption to drone broadcast.

In some embodiments, drone takeoff and/or landing may be handled autonomously by the drone coordination server. Alternatively, a drone 220 may be at least partially under manual control during these sequences.

Copilot And Autopilot

According to certain embodiments, the drone security system 200 may comprise a "Copilot" for assisting with drone management. The Copilot may include software, firmware, and/or hardware external from a drone 220 and configured to receive telemetry data from the drone 220, In an example embodiment, the copilot may comprise proprietary communication and drone management software at least partially running or resident on a computing device. For example, the copilot may run on a Raspberry Pi or other system on a chip (SOC). Alternatively, the Copilot may comprise a combination of different single-board computers.

In some embodiments, the Copilot may receive user commands from the app or other user software. The Copilot may be linked to the Drone Coordination Relay by ROS and/or HTTP/REST. The Copilot may communicate with an Autopilot system for remotely piloting an aircraft that is out of sight. In an example embodiment, the Autopilot system may comprise an open-source autopilot system oriented toward autonomous aircraft.

Access Control

According to certain embodiments, the system 200 may include access control functionality, wherein access to drone functionality may be limited on a per-user(s) and/or per-location(s) basis. Permissions may define which functionality is available to a user. A role may be a system-wide group or class of permissions and a user may be granted a different role for each location.

Drone Dock

Figure 6:
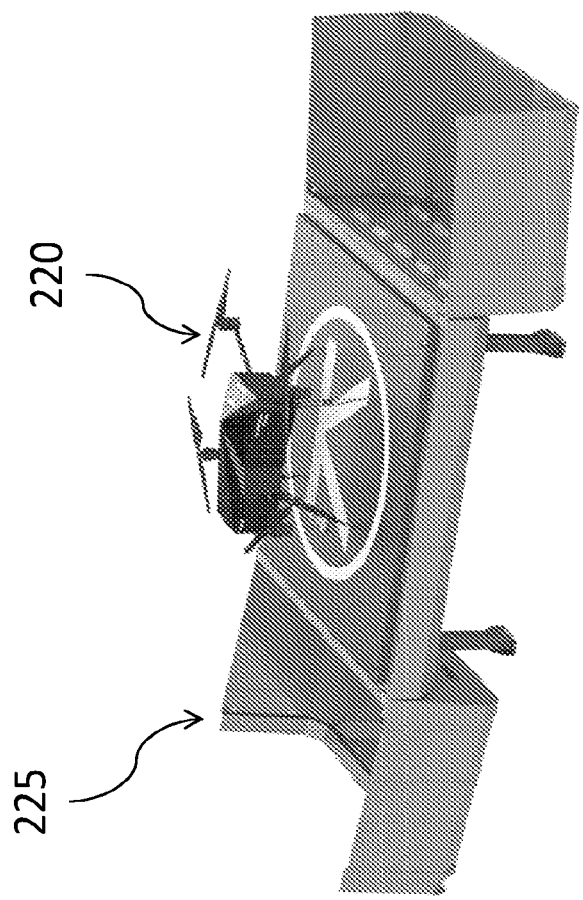
FIG. 6 depicts an illustration of the automated drone security system dock in an open state, according to an example embodiment.
Figure 5:
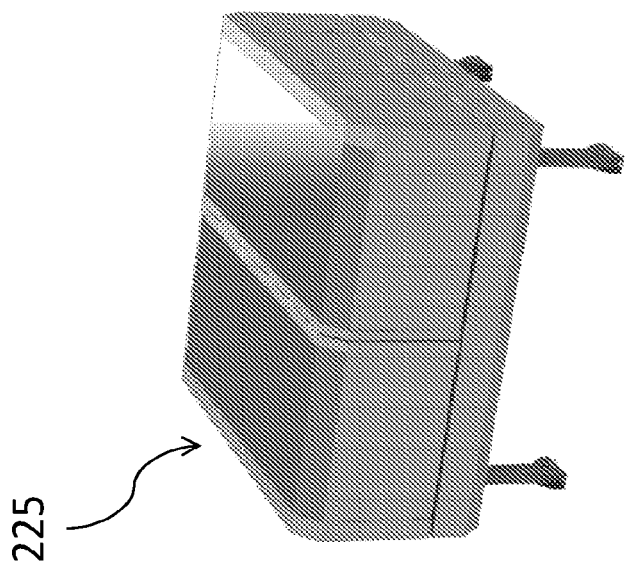
FIG. 5 depicts an illustration of the automated drone security system dock in a closed state, according to an example embodiment.

According to certain embodiments, the drone security system 200 may comprise a docking station or other platform 225 for storing and landing/launching drones 220. For example, FIG. 5 depicts an illustration of the automated drone security system dock in a closed state, according to an example embodiment. FIG. 6 depicts an illustration of the automated drone security system dock in an open state, according to an example embodiment.

Such a dock 225 may be referred to herein as a "nest." In some embodiments, the dock 225 may serve as a housing for the drone 220, and may be located on rooftops, cars, in a backyard, or elsewhere. The dock 225 may protect the drone 220 from the elements while it recharges or awaits an operation. Once a dock 225 is installed, the drone 220 fleet may be operated remotely, so that there is no need to manually access the dock 225 during routine operation.

In some embodiments, a drone 220 may charge while docked. In an example embodiment, a nest may supply a minimum of 12 volts at 10 amps for fast charging. The dock 225 may be connected to an external power grid, or receive power from alternative sources such as solar, wind, and/or thermal and/or store this power in an external power supply such as one or more batteries. In certain embodiments, the external power supply of the dock 225 may be one or more backup batteries so that the dock 225 may still open/close or even continue to charge drones 220 during a power outage, overcast weather, and/or other disruptions to the power supply.

In some embodiments, a drone 220 may be charged through induction or through contact with conductive receivers on the dock 225 and the body of the drone 220. In an example embodiment, the conductive receivers may be conductive pads on the legs and/or feet of a drone 220 that contact charging terminals on a floor or landing pad of the dock 225. In some embodiments, a drone 220 may be "hot charged" such that drone 220 down time or unavailability in between or during operations may be minimized.

In some embodiments, the dock 225 may maintain a network connection through a wired (Ethernet) or wireless connection (e.g., WiFi, 3G, 4G, LTE, etc.). The dock 225 may also report dock status, including whether the dock 225 is open or closed, empty or occupied, charging a drone 220 or not, receiving external power, the location of the dock 225, a level of charge of one or more backup batteries, maintenance alerts, or other sensor data related to the dock 225. In another embodiment, the dock 225 may also share its network connection with a docked drone 220, or assume responsibility for reporting drone status in addition to or in place of the drone 220.

In some embodiments, the dock 225 may be equipped with one or more cameras. Accordingly, the dock 225 may also provide a live video feed or two-dimensional and/or three-dimensional images of its surroundings. The dock 225 may also be equipped with various sensors and in yet another embodiment, the dock 225 may be equipped with radar or other object-detection systems.

In some embodiments, the dock 225 may provide autonomous landing guidance. For example, differential GPS data detected onboard (e.g., RTK GPS) may be used to automatically or partially automatically guide a drone within range of optical recognition. Once the drone 220 is in range, cameras or other image capture devices may be used to recognize lights or other identifiers on the drone 220. In an example embodiment, there may be multiple mono and/or stereo cameras on the landing pad of the dock 225. The drone 220 may be outfitted with focused LED lights in custom patterns and lighting up in sequence. Redundant visual sensor placements and LED arrays/reflectors on the drone 220 may be tuned in such a way that an LED array/reflector is always visible to one of the optical sensors on dock 225, even if the lighting conditions are less than ideal if, for example, the sun lies directly in the line of sight of one or more of the visual sensors.

Additionally polarized filters may be employed, so that the camera recognizes the LED arrays/reflectors even with conflicting sources of light. A strobing pattern or other predetermined pattern may help the processor of the dock 225 identify the orientation and approximate distance of the drone 220. Accordingly, the dock 225 may visually verify that the correct drone 220 is in appropriate position to dock 225. An imaging algorithm may be used in conjunction with telemetry to establish a landing trajectory, which may then be communicated to the drone 220.

In some embodiments, the dock 225 may be secured to prevent physical and/or electronic tampering. For example, a locking mechanism may keep the dock 225 sealed when a drone 220 is not preparing to launch or land in the dock 225. Moreover, electronic access to the dock 225 may be limited through access control as described herein or the like. In an example embodiment, intrusion or tampering may be detected automatically so that a response can be triggered (e.g. setting of an alarm). The alarm may include emitting an audible siren or other indication of emergency. The alarm may also include notifying an owner or operator of the dock 225 by the app, textual message, or other electronic means. In some embodiments, dock 225s expected to be placed in high-risk areas may be hardened or contain additional features to prevent intrusion or weather damage.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A security system for surveilling a location, comprising:

a drone comprising one or more onboard sensors and an imaging device for measuring surveillance data at least comprising images and telemetry data of the location, the drone being capable of executing a flight operation for surveilling the location for a period of time, storing and transmitting the surveillance data to a server assembly;

the server assembly for coordinating the drone and receiving the surveillance data measured from the drone;

a drone dock operable for drone launching, landing, and/or storing the drone; and a user computing device in communication with the server assembly and the drone, the user computing device having a non-transitory storage medium, a processor for processing the surveillance data between the server assembly and the drone, and a user interface for receiving user input and displaying the surveillance data from the drone, wherein, the flight operation is automatically and/or manually controlled by the user computing device or the server assembly in connection with the location, the server assembly comprises (a) a database server operatively connected to one or more web servers across one or more networks, each server operable to permanently store and continuously update a database of master surveillance data, telemetry information, mission data, collision mapping, drone coordination, air traffic control, captured images, and video streams, (b) a stream server for live video and image streaming, and (c) a notify server for automatically transmitting alert messages between the drones, the user computing device, and the server assembly, and a web service is dynamically provisioned pending network bandwidth associated with the one or more networks, encryption of the surveillance data, and the video and image streaming.

2. The security system of claim 1, wherein a battery of the drone is charged by the drone dock through a conduction pad or through an inductive charging device.

3. The security system of claim 2, wherein when the battery of the drone has a minimum charge, the drone is automatically returned to the drone dock for charging.

4. The security system of claim 2, further comprising flight and security control logic comprising one or more of the following processes:

executive logic defined by one or more predefined flight and operation procedures triggered by sensor states associated with the one or more onboard sensors of the drone including velocity, a timer, an inertial measurement unit, and/or a global positioning system (GPS);

flight range prediction logic defined by a status of the battery of the drone and environmental conditions including wind speed and direction, humidity, altitude, temperature, and air pressure, and a flight trajectory planner associated with one or more flight operations; and autonomous logic associated with the flight range prediction logic including collision avoidance logic and control and encryption for information transmitted between the drone, the server assembly and the user computing device.

5. The security system of claim 4, the collision avoidance logic including a detect and track module associated with static and dynamic structures and obstacles defined by a predetermined location, a predetermined flight path, and/or static and dynamic structures and obstacles sensed by the one or more onboard sensors of the drone.

6. The security system of claim 4, the system further comprising: one or more additional drones and associated onboard computing systems with flight and security control logic, imaging devices, onboard sensors and associated sensor states;

wherein the user computing device or the server assembly partially or automatically manage a flight operation associated with each of the one or more additional drones for continuous dynamic aerial coverage of the location.

7. The security system of claim 6, the system further comprising a process comprising: forming or monitoring a continuously-updated two-dimensional and/or three-dimensional map of the location with image stitching logic defined by two- and/or three-dimensional blending of previously and live recorded two- and/or three-dimension data gathered from the one or more onboard sensors and imaging devices of each drone.

8. The security system of claim 6, wherein one or more of the drones of the system maintain connectivity with the server assembly or the user computing device through 3G/4G, RF, and/or a local wireless network.

9. The security system of claim 8, wherein one or more of the drones or the user computing device is automatically configured based on data detected from onboard sensors of the one or more drones, alert messages are automatically configured based on one or more predetermined detected parameters of the location or one or more of the drones, and causes alert messages to be manually or automatically transmitted to the user computing device or other user computing devices securely connected therewith.

10. The security system of claim 6, further comprising: a plurality of drone docks positioned on or throughout the location, wherein each drone is capable of being housed, landing upon, or receiving a charge to its battery in connection with any one of the plurality of drone docks, wherein each drone dock is wirelessly connectable to the server assembly and the user computing device to store and transmit data from one or more of the drones docked thereon.

11. The security system of claim 6, the user computing device is configured to manually or automatically select one of the drones to execute one of a plurality of flight operations.

12. The security system of claim 6, the user computing device is configured to live view the flight operation being executed by drones of the security system and for viewing previously captured data by the drones of the system.

13. The security system of claim 2, wherein the drone operates according to one or more of the following states:

a non-operational state defined by being docked on the drone dock;

a charging state defined by receiving a charge on the drone dock;

an on-duty state when the drone is executing the flight operation; and a malfunction state when the drone is malfunctioned and needs to be repaired.

14. The security system of claim 1, the system further comprising a video feed system comprising one or more of the following processes:

stream quarter video graphics array (QVGA) video from an onboard computing system of the drone to a cloud server associated with the server assembly with a predetermined latency;

relay the QVGA video from the cloud server to the user computing device with the predetermined latency; and stream or upload video in a predetermined format from the onboard computing system of the drone to the cloud server, wherein the predetermined format is determined pending network bandwidth and encryption.

15. The security system of claim 1, wherein the user interface displays operational status of the drone.

16. An automated drone security system comprising:

a drone comprising one or more onboard sensors and an imaging device for measuring surveillance data comprising images and telemetry data of the location, the drone being capable of executing a flight operation for a period of time, storing and transmitting the surveillance data to a server assembly;

the server assembly for coordinating the drone and receiving data measured from the drone, wherein the server assembly comprises (a) a database server operatively connected to one or more web servers across one or more networks, each server operable to permanently store and continuously update a database of master surveillance data, telemetry information, mission data, collision mapping, drone coordination, air traffic control, captured images, and video streams, (b) a stream server for live video and image streaming, and (c) a notify server for automatically transmitting alert messages between the drones, a mobile computing device, and the server assembly, and wherein a web service is dynamically provisioned pending network bandwidth associated with the one or more networks, encryption of the surveillance data, and the video and image streaming;

a drone dock operable for drone launching, landing, and/or storing the drone; and the mobile computing device comprises a non-transitory storage medium, a processor for processing the surveillance data transmitted between the server assembly and the drone, and a user interface for receiving user input and displaying the surveillance data transmitted from the drone, wherein the flight operation is automatically and/or manually controlled by the mobile computing device or the server assembly in connection with the location.

17. The automated drone security system of claim 16, wherein the mobile computing device enables the following management capabilities:

continuous monitoring of the location by forming a continuously updated surveillance map and one or more live streams of the location;

configuring of alert message parameters for transmitting one or more alert messages and recipients of the one or more alert messages;

selective viewing the one or more live streams;

deactivation and/or reactivation of one or more drones;

control of one or more parameters of the one or more onboard sensors of the drone including minimum thresholds for a predetermined alert or pan, zoom, tilt, direction, and frames per second for the imaging device; or activation one or more alarm conditions on one of the one or more onboard sensors or the imaging device.

18. The automated drone security system of claim 16, wherein the server assembly further comprises flight and security control logic comprising one or more of the following processes:

executive logic defined by one or more predefined flight and operation procedures triggered by sensor states associated with one or more onboard sensors of the drone including velocity, a timer, an inertial measurement unit, or a global positioning system (GPS);

flight range prediction logic defined by a status of the battery of the drone and environmental conditions including wind speed and direction, humidity, altitude, temperature, and air pressure, and a flight trajectory planner associated with one or more flight operations; and autonomous logic associated with the flight range prediction logic including collision avoidance logic and control and encryption for information transmitted between the drone, the server assembly and the mobile computing device.

19. The automated drone security system of claim 16, wherein:

the automated drone security system further comprises one or more additional drones and associated onboard computing systems with flight and security control logic, imaging devices, and sensor state;

the mobile computing device or the server assembly partially or automatically manage a flight operation associated with each drone for continuous dynamic aerial coverage of the location; and a continuously-updated two-dimensional and three-dimensional map is formed on the user interface of the mobile computing device of the location with image stitching logic defined by two- and/or three-dimensional blending of previously and live recorded two- and/or three-dimension data gathered from the one or more onboard sensors and imaging devices of each drone.

* * * * *